United States Patent [19]
Deosaran et al.

[11] Patent Number: 5,590,295
[45] Date of Patent: Dec. 31, 1996

[54] SYSTEM AND METHOD FOR REGISTER RENAMING

[75] Inventors: Trevor A. Deosaran, Sunnyvale; Sanjiv Garg, Fremont; Kevin R. Iadonato, San Jose, all of Calif.

[73] Assignee: Seiko Epson Corporation, Japan

[21] Appl. No.: 478,531

[22] Filed: Jun. 7, 1995

Related U.S. Application Data

[63] Continuation of Ser. No. 997,948, Dec. 31, 1992, abandoned.

[51] Int. Cl.$^6$ ...................................................... G06F 9/30
[52] U.S. Cl. ............................................................ 395/393
[58] Field of Search .............................. 395/375; 364/491

[56] References Cited

U.S. PATENT DOCUMENTS

| | | | |
|---|---|---|---|
| 4,992,938 | 2/1991 | Cocke et al. | 364/200 |
| 5,255,384 | 10/1993 | Sachs et al. | 395/425 |
| 5,261,071 | 11/1993 | Lyon | 395/425 |
| 5,278,963 | 1/1994 | Hattersley et al. | 395/414 |
| 5,355,457 | 10/1994 | Shebanow et al. | 395/375 |
| 5,371,684 | 12/1994 | Iadonato et al. | 364/491 |
| 5,487,156 | 1/1996 | Popescu et al. | 395/375 |

OTHER PUBLICATIONS

Kateveris, Hardware Support "Thesis", 1984, pp. 138–145.
John L. Hennessy & David A Patterson, "Computer Architecture A Quantitative Approach", Ch. 6.4, 6.7 and p. 449, 1990.

Bruce D. Lightner and Gene Hill, "The Metaflow Lightning Chipset*", pp. 13, 14, 15 and 16, 1991 IEEE publication.

Lightner et al., "The Metaflow Architecture", pp. 11, 12, 63, 64, 67, 68, Jun. 1991 IEEE Micro Magazine.

*Primary Examiner*—William M. Treat
*Assistant Examiner*—Saleh Najjar
*Attorney, Agent, or Firm*—Sterne, Kessler, Goldstein & Fox P.L.L.C.

[57] ABSTRACT

A system and method for performing register renaming of source registers in a processor having a variable advance instruction window for storing a group of instructions to be executed by the processor, wherein a new instruction is added to the variable advance instruction window when a location becomes available. A tag is assigned to each instruction in the variable advance instruction window. The tag of each instruction to leave the window is assigned to the next new instruction to be added to it. The results of instructions executed by the processor are stored in a temp buffer according to their corresponding tags to avoid output and anti-dependencies. The temp buffer therefore permits the processor to execute instructions out of order and in parallel. Data dependency checks for input dependencies are performed only for each new instruction added to the variable advance instruction window and register renaming is performed to avoid input dependencies.

17 Claims, 8 Drawing Sheets

SYSTEM AND METHOD FOR REGISTER RENAMING

This application is a continuation of application Ser. No. 07/997,948, filed Dec. 31, 1992, now abandoned.

CROSS-REFERENCE TO RELATED APPLICATIONS

The following are related, commonly owned, co-pending applications:

*Superscalar RISC Instruction Scheduling*, U.S. Pat. No. 5,497,499, issued Mar. 5, 1996;

*Semiconductor Floor Plan and Method for a Register Renaming Circuit*, U.S. Pat. No. 5,371,684, issued Dec. 6, 1994;

*System and Method for Retiring in a Superscalar Microprocessor*, Ser. No. 08/481,146, filed Jun. 7, 1995, which is a continuation of Ser. No. 07/877,451, filed May 15, 1992, now abandoned;

*High Performance RISC Microprocessor Architecture*, Ser. No. 07/817,810, filed Jan. 8, 1992;

*Extensible RISC Microprocessor Architecture*, Ser. No. 08/397,016, filed Mar. 1, 1995, which is a continuation of Ser. No. 07/817,809, filed Jan. 8, 1992, now abandoned.

The above cited patent documents are incorporated herein by reference.

BACKGROUND OF THE INVENTION

1. Field of the Invention

The present invention relates to superscalar reduced instruction set computers (RISC), more particularly, the present invention relates to a register renaming circuit for superscalar RISC computers.

2. Related Art

A more detailed description of some of the basic concepts discussed in this application is found in a number of references, including Mike Johnson, *Superscalar Microprocessor Design* (Prentice-Hall, Inc., Englewood Cliffs, N.J., 1991) (hereafter Johnson); John L. Hennessy et al., *Computer Architecture—A Quantitative Approach* (Morgan Kaufmann Publishers, Inc., San Mateo, Calif., 1990). Johnson's text, particularly Chapters 2, 6 and 7 provide an excellent discussion of the register renaming issues addressed by the present invention.

A major consideration in a superscalar RISC processor is to how to execute multiple instructions in parallel and out-of-order, without incurring data errors due to dependencies inherent in such execution. Dam dependency checking, register renaming and instruction scheduling are integral aspects of the solution. A detailed discussion of storage conflicts, register renaming and dependency mechanisms is found in commonly owned, co-pending U.S. patent application Ser. No. 07/860,719, filed Mar. 31, 1992, (hereafter referred to as the '719 application).

The '719 application discloses a register renaming circuit (RRC) having a fixed instruction window. In the fixed instruction window, dependency checking and resource assignment is done on the same set of instructions until all the instructions in the set are completed. This means that there is a fixed relationship between each instruction's position in the instruction stream and the instruction number used for resource assignment.

For example, in an instruction stream with an instruction window of 4 instructions every fourth instruction mapps to instruction A (i.e., the first instruction in the window). This technique makes re-mapping of instruction very simple. In this case a 4-to-1 multiplexer is all that is necessary for each resource to forward a single instruction to that resource. However, the fixed format requires that the instruction window be advanced by a fixed amount, which results in somewhat inefficient processing.

When an instruction retires (an instruction can retire after it has been executed without exception and when all previous instructions have been executed and their results are stored in the register file), its result is moved into a main register file (i.e., the programmable visible register file) and if any instructions were dependent on that instruction, their renamed sources are not needed anymore. In the architecture disclosed in the '719 application, all instructions' sources are renamed every cycle. This renaming technique requires many comparators for performing the dependency checks. More specifically, the source register addresses of each instruction must be compared to the destination register addresses of all preceding instructions in the instruction window every cycle.

What is desired is a more efficient register renaming technique requiring less comparators and permitting the processor to execute instructions in parallel and out of order.

SUMMARY OF THE INVENTION

The present invention is directed to a system and method for performing register renaming of source registers on a per-cycle basis only for new instructions added to the instruction window in that cycle. The present invention thus reduces the total number of dependency check comparators necessary for performing register renaming.

A preferred embodiment of the present invention comprises storing the instructions in a variable advance instruction window, and assigning a tag to each instruction in the instruction window. The tag of each retired instruction is assigned to the next new instruction to be added to the instruction window. The results of instructions executed by the processor are stored in a temp buffer according to their corresponding tags to avoid output dependencies and anti-dependencies. The temp buffer therefore permits the processor to execute instructions out of order and in parallel.

Data dependency checks are performed only for each new instruction added to the instruction window. Operands of the instructions having input dependencies are often located in the temporary buffer, and the source register addresses of those instructions having dependencies are renamed according to the tags of the operands located in the temp buffer. The renamed source register addresses are then stored in a rename result register file.

The foregoing and other features and advantages of the present invention will be apparent from the following more particular description of the preferred embodiments of the invention, as illustrated in the accompanying drawings.

BRIEF DESCRIPTION OF THE DRAWINGS

The invention will be better understood if reference is made to the accompanying drawings. A brief description of the drawings is as follows.

DETAILED DESCRIPTION OF THE INVENTION

Figure 1:
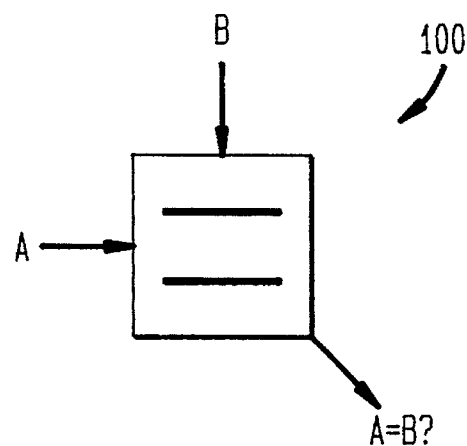
FIG. 1 shows a representative block diagram of a DDC equal compare circuit of the present invention.

The terms processor, CPU, and digital processor are often used interchangeably in this field. The term "processor" is used hereafter with the understanding that other similar terms could be substituted therefore without changing the underlying meaning of this disclosure.

The present invention is directed to a Register Renaming Circuit (RRC) which is part of a processor. The RRC permits the processor to execute instructions in parallel and out of order. In a preferred embodiment of the present invention, the processor has a variable advance instruction window (VAIW) for holding instructions from an instruction stream prior to execution. The RRC can be used with a fixed advance instruction window as well.

The VAIW in a preferred embodiment holds eight instructions, and up to four new instructions can be added to the top four locations of the VAIW in any one cycle.

In a VAIW, any one of instructions I0, I1, I2 and I3 can be mapped into the first location in the window (location A, for example). Tags are assigned to the instructions as the instructions enter the VAIW. The tags are stored in a first-in-first-out buffer (hereafter called a FIFO; not shown).

As an instruction advances in the VAIW by a variable amount, the tag associated with that instruction also advances in the FIFO by the same amount. When a new instruction enters the VAIW it is assigned the tag of the most recent instruction to leave the VAIW, thus tags are reused. Instructions can leave the VAIW by either retiring, or they can be flushed out if a branch is taken.

The tag of each instruction leaving the instruction window is returned to the head of the FIFO and re-used by the new instruction added to the window. However, the first instruction and tag in the FIFO always progress in order, because instructions always retire in order.

According to the present invention only new instructions in the VAIW need be checked for dependencies. This eliminates the need for excess comparators. New instructions in the window are therefore passed through the RRC. In order to reduce complexity by renaming the source registers for only those instructions that are new in the instruction window on a per-cycle basis, two assumptions are made:

1. Each instruction's tag remains constant as long as the instruction remains in the window. This tag is also associated with the location in a temp buffer (discussed below) that the corresponding instruction's output will be stored.

2. At most, only a subset ($I_n$ to $I_{n-1}$) of the instructions in the window ($I_n$ to $I_0$) can be new in any given cycle.

In a preferred embodiment of the present invention, the temp buffer (or temporary buffer) is part of the main register file. The register file contains 40 registers; registers 0–31 are the main registers (commonly called the programmer visible registers), and registers 32–39 comprise the temp buffer. The temp buffer and main register file share the same read ports. Thus, to read the data from temp buffer address 4, {100100} would be the address on the read address port, for example.

In order to perform dependency checking in the present invention, an RRC Inputs Register File (RIRF) is used to hold the source and destination register addresses of all instructions in the instruction window. As new instructions enter the window an instruction fetch unit (IFU: not shown) sends the instructions' source and destination register addresses to the RIRF. The source and destination register addresses are stored in the RIRF by tag number. The RIRF has one output for each instruction in the window and the source and destination register addresses are read from the RIRF and sent to the RRC.

The RRC performs the data dependency checking and the register renaming. The data dependency check is done by the Data Dependency Checker (DDC) and the rename is performed by the Tag Assignment Logic (TAL).

There are three kinds of data dependencies: input dependencies, anti-dependencies and output dependencies. An instruction is input dependent on a previous instruction if one of its inputs is the previous instruction's output; an instruction is anti-dependent if the address of one of its source registers (RS) is the same as the address of a later instruction's destination register (RD); and an instruction is output dependent if the address of its destination register is the same as the address of another instruction's destination register.

Dependencies limit the amount of parallelism that a computer can exploit. For example, if instruction A is input dependent on instruction B, then instruction A must not be executed until after instruction B is executed. Also, if instruction A and B are output dependent and instruction A comes first in the program, then instruction A's result must be written to the main register file before instruction B's. Finally, if instruction A is anti-dependent on instruction B, then instruction B's result must not be written to the main register file until after instruction A has begun executing. Output and anti-dependencies are usually avoided by use of the temp buffer. Input dependencies cannot be avoided and are located by the DDC.

The DDC locates input dependencies by comparing the register file addresses of each instruction's sources with the register file addresses of each previous instruction's destination. If an instruction's input data comes from the same register file address as a previous instruction's output dam, then they are dependent (the term "dependent" will be used to mean "input dependent" for the remainder of this description).

It is possible that an instruction can be dependent on several previous instructions. When this happens, the RRC assumes that the programmer intended that the instruction be dependent on the most previous instruction. For example, if instruction 5 depends on instructions 3 and 1, then the RRC would assume that the programmer intended instruction 5 to use instruction 3's results and not instruction 1's.

Figure 2:
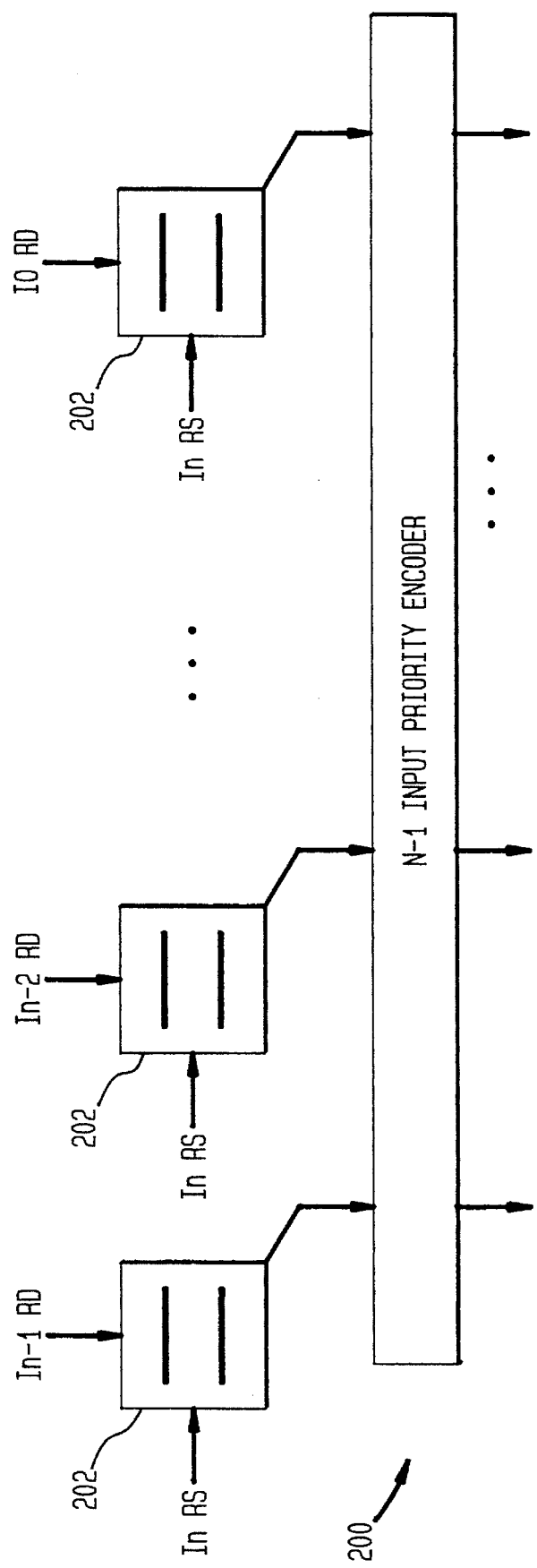
FIG. 2 shows a representative block diagram of an N–1 input priority encoder of the present invention.

A DDC equal compare circuit 100 for checking dependencies between instructions A and B in accordance with the present invention is shown in FIG. 1. The output (A=B?) of the DDC equal compare circuit 100 is sent to a priority encoder. A n−1 input priority encoder 200 is shown in FIG. 2. Priority encoder 200 checks the highest priority dependency for instruction n's source ($I_n$RS). The inputs at the top of priority encoder 200 are the dam dependency comparisons of instruction n's source (IS) with the destinations of all previous instructions ($I_{n-1}RD$-$I_0RD$), as determined by equal compare circuits 202. For example, if the $x^{th}$ bit of the priority encoder output is asserted, then instruction n is input dependent on instruction x.

The present invention avoids the problems caused by output and anti-dependencies by storing the results of all instructions in the temp buffer and then moving the results into the main register file in program order. For example, if instruction 1 finishes before instruction 0, its result will be written to the register file after instruction 0's result is written to the register file. The use of the temp buffer allows the processor to execute instructions out of order and in parallel. Since the results of the instructions are moved to the main register file in order, output and anti-dependencies do not cause a problem.

Since the result of an instruction can sit in the temp buffer for a long time before it gets moved to the main register file, instructions that are dependent on that instruction will also have to wait. In order to improve performance, the present invention includes a means with which to use data that is in the temp buffer. That means is the Tag Assignment Logic (TAL).

The TAL determines the location in the temp buffer of the operands of dependent instructions. As noted above all instructions are assigned a tag that remains constant while the instruction is in the window, and there is one location in the temp buffer for each instruction in the window. Thus, the processor implementing the present invention uses the tag of an instruction as the temp buffer address of that instruction's result.

Since the TAL knows where every instruction's result is stored, and since it also knows (from the DDC) where the dependencies are between instructions, the TAL can determine the location in the temp buffer of each instruction's inputs.

Figure 3:
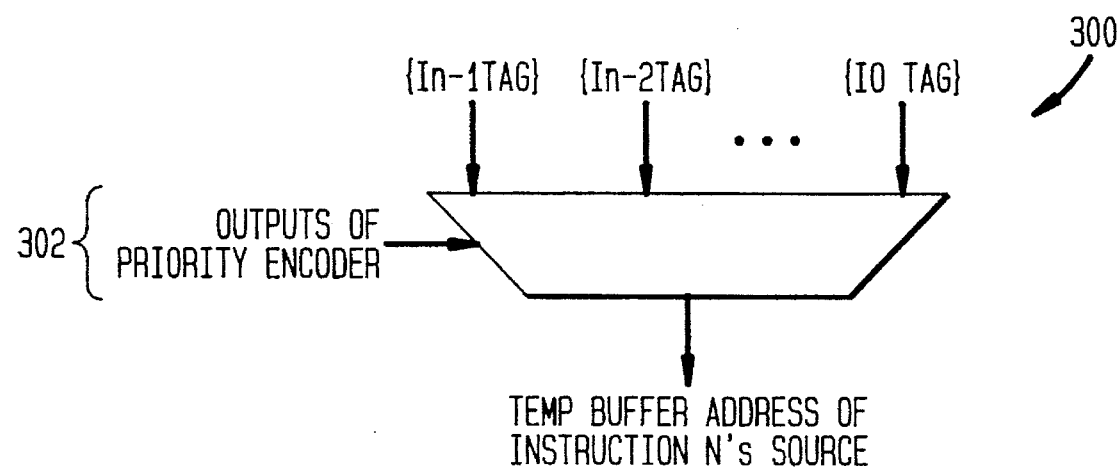
FIG. 3 shows a representative block diagram of the tag assignment logic (TAL) of the present invention.

A representative block diagram of a TAL 300 used to determine the location of instruction n's source (RS) is shown in FIG. 3. The outputs of the priority encoder are connected as select lines (as shown generally at 302) to select the $I_{n-1}$ through $I_0$ TAGs, which are input at the top of TAL 300. TAL 300 thus outputs the temp buffer address of instruction n's source.

Figure 4:
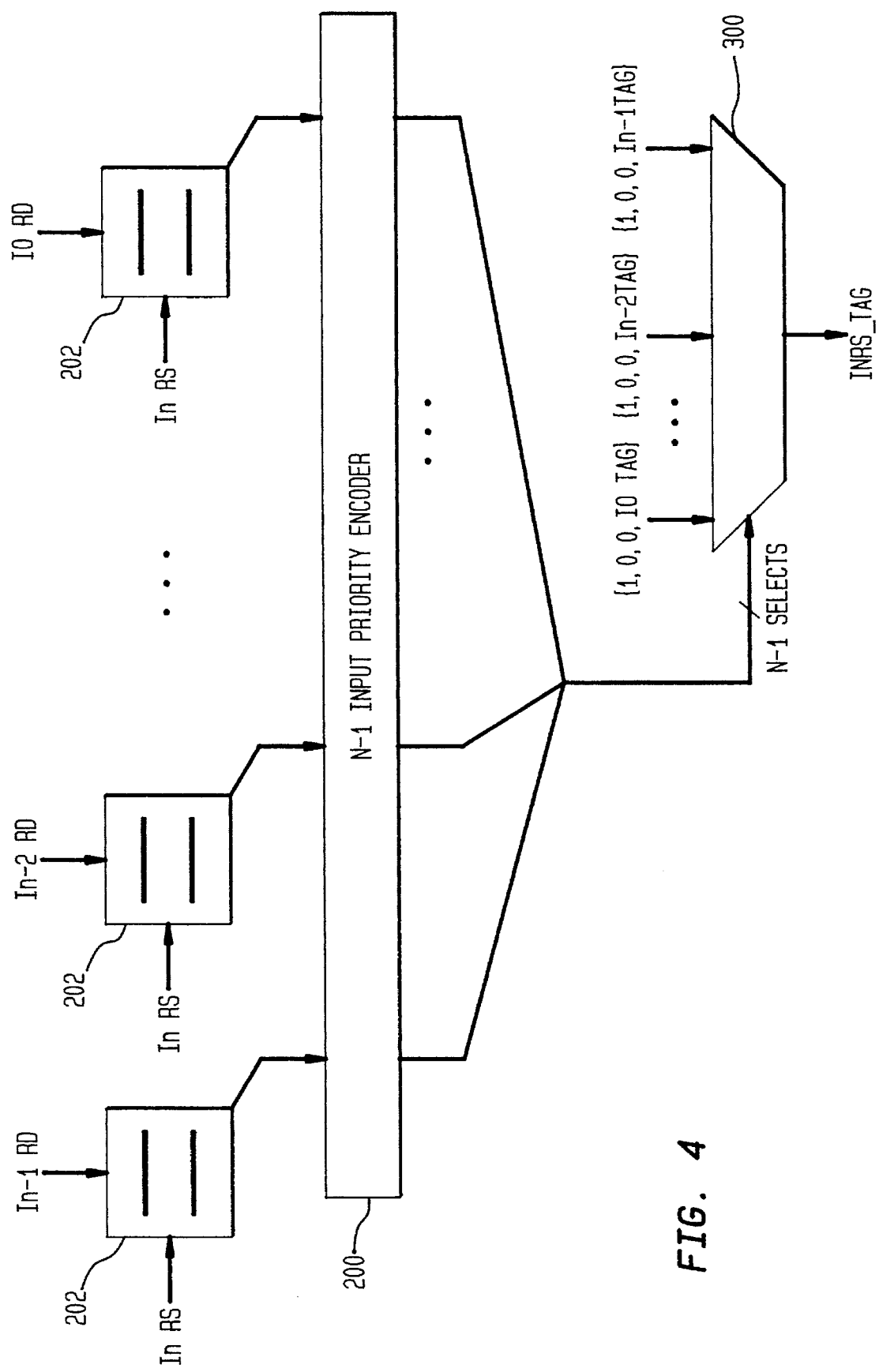
FIG. 4 shows a representative block diagram of the TAL and priority encoder circuit of the present invention.

A complete rename circuit for instruction n's source register is shown in FIG. 4. The term for the renamed register file address of instruction n's source is INRS_TAG.

Figure 5A:
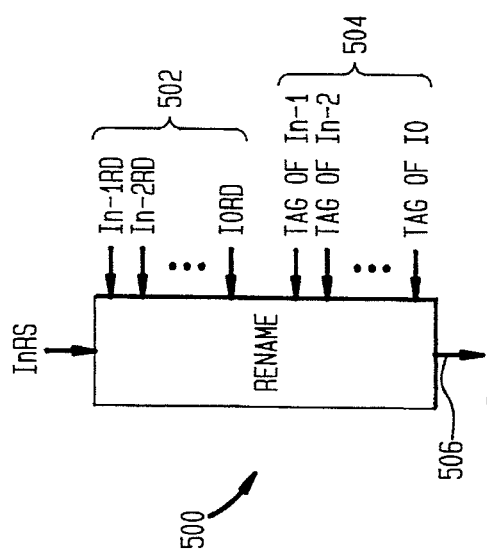
FIGS. 5A and 5B show representative block diagrams of the register rename block of the present invention.

A representative block diagram of a rename circuit 500 of the present embodiment is shown in FIG. 5A. The address of a new instruction's source register ($I_n$RS) is shown input at the top of the rename circuit 500. The destination register addresses of all preceding instructions in the window are input to rename circuit 500, as shown generally at 502. In addition, all the tags of all preceding instructions in the window are input to rename circuit 500, as shown generally at 504. Rename circuit 500 outputs a tag for the new instruction's source register ($I_n$RS), as shown at 506. The new $I_n$RS tag is assigned by rename circuit 500 according to any dependencies, as discussed above in connection with the other embodiment(s). If the instruction has no dependencies the address input at the top input is simply passed to the output. Given a VAIW of 8 instructions and assuming that the temp buffers have the 8 highest addresses of the 40 total registers, the most significant bit of the rename circuit 500 output indicates whether the result is in the main register file or the temp buffer.

Figure 5B:
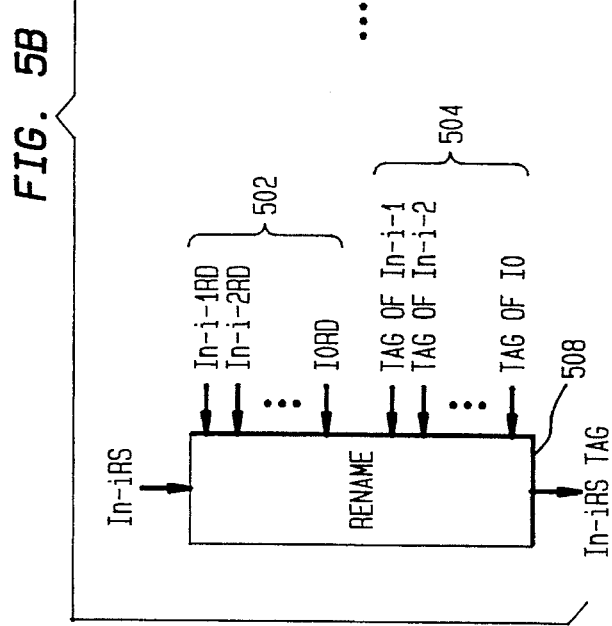

Renaming circuits 508 for renaming the source registers of a plurality of instructions are shown in FIG. 5B. The number "i" in FIG. 5B corresponds to the maximum number of instructions in the window that can be new. In a preferred embodiment "i" is equal to 3; thus requiring 4 rename circuits.

Because renaming only happens when a new instruction enters the window, some technique is needed to store the outputs of the RRC. One technique would be to store the RRC results in a FIFO whenever the instruction window advances. The present embodiment, however, stores the renamed registers in a separate register file (discussed below). Since each instruction's tag stays constant, the renamed source register results from the rename circuits can be stored by tag number. The register file for storing the rename results therefore has one write port for each new instruction in the window and one read port for each instruction in the window.

Figure 6:
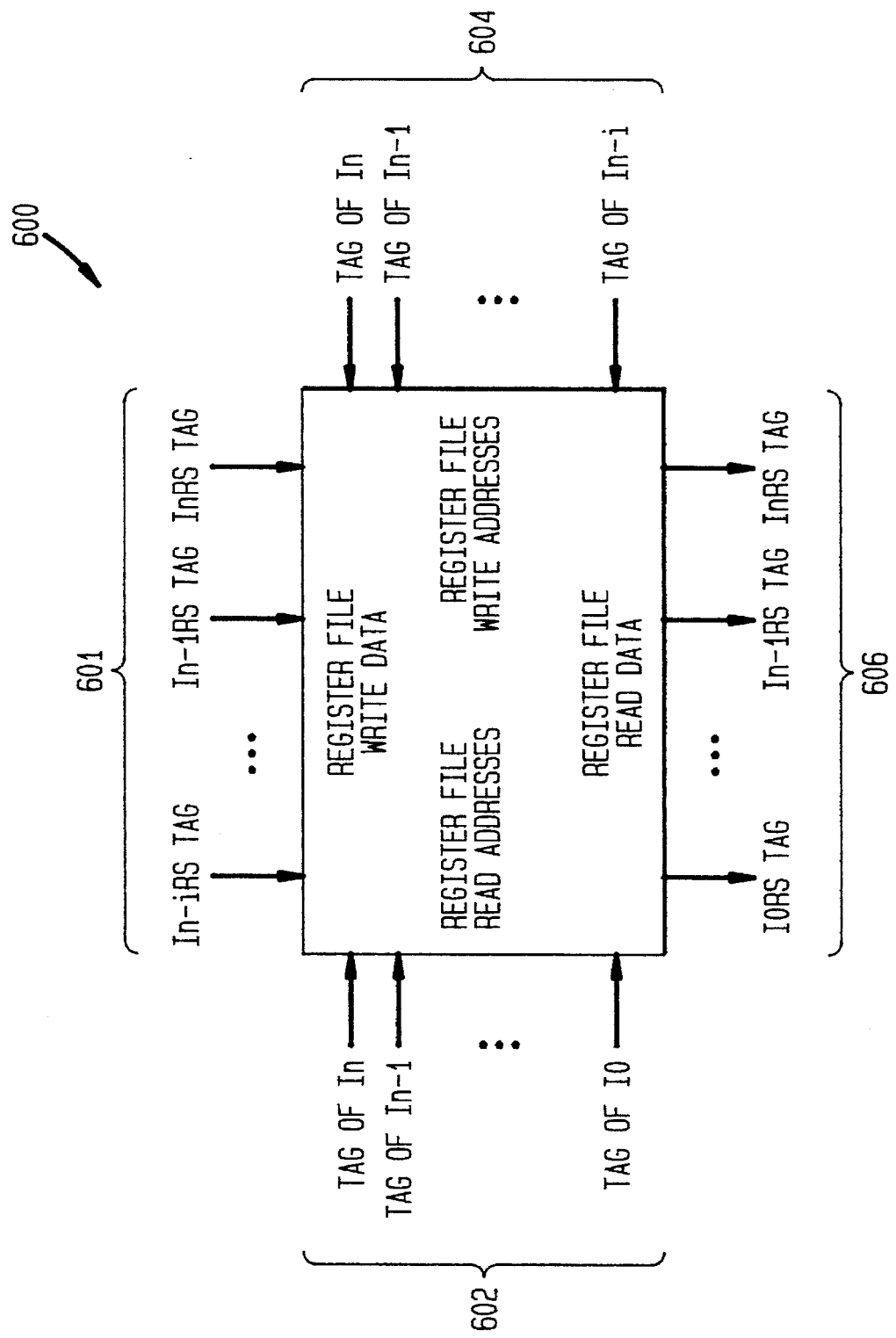
FIG. 6 shows a representative block diagram of the register rename register file of the present invention.
Figure 7:
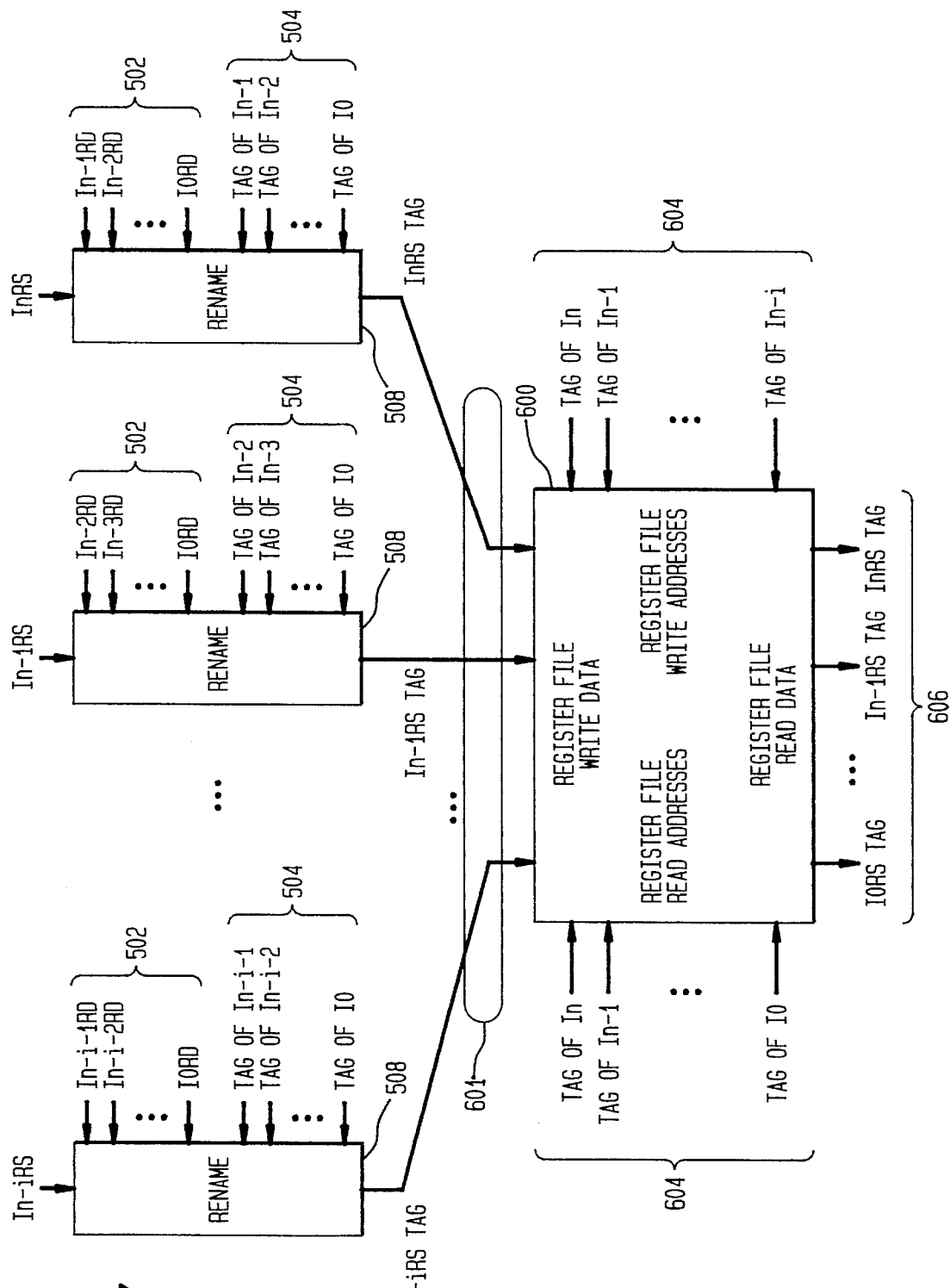
FIG. 7 shows a representative block diagram of the interconnection of the blocks of FIGS. 5B and 6.

A representative block diagram of a rename result register file (RRRF) 600 is shown in FIG. 6. The renamed results are input as "WRITE DATA", as shown generally at 601. "READ ADDRESS" and "WRITE ADDRESS" tags are input to register file 600, as shown generally at 602 and 604, respectively. Renamed results for all the sources of all instructions in the window are available as "READ DATA", as shown generally at 606. FIG. 7 shows rename circuits 508 connected to rename result register file 600.

When an instruction retires its result is moved into the main register file. If any instructions were dependent on that instruction, their renamed sources are not needed anymore.

The area to which new instructions can enter the instruction window (in this embodiment the area is the top four locations), are those locations which are register renamed. Once an instruction leases that area of the window it is no longer renamed. The RRC of the present invention renames an instruction's source register when it enters the window, so there needs to be a mechanism to detect which instructions' sources have been moved to the register file and to replace the renamed source register address with the original source register address. The first part of that mechanism is called MONDEP (as in "monitor dependencies") and the second part is called RFMXING. In addition, a source register ready generator (RDY_GEN) is used to determine when each instruction's sources are available.

Figure 8:
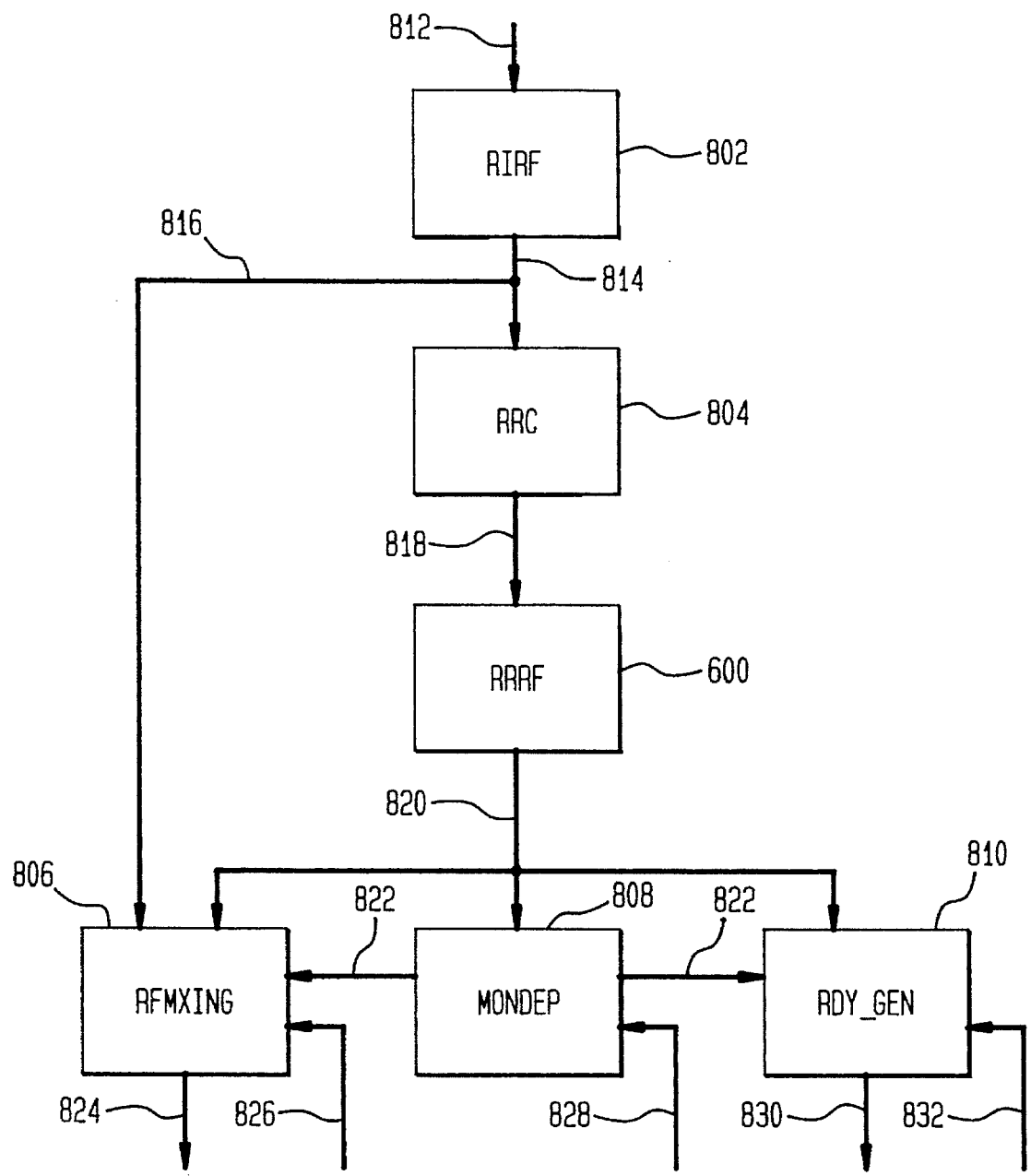
FIG. 8 shows a representative high level block diagram including the RRC of the present invention.

A representative high level block diagram of the RIRF, RRC, RRRF, MONDEP, RDY_GEN and RFMXING (labeled as 802, 804, 600, 806, 808 and 810, respectively) is shown in FIG. 8. Each block 802, 804, 600, 806, 808 and 810 receives the tags of all instructions in the instruction window from the tag FIFO (not shown). Implementation of the tag FIFO will become obvious to one skilled in the art.

Source and destination register addresses of new instructions from the IFU (not shown) are sent to RIRF 802 via a bus 812, and are accessed by RRC 804 via a bus 814. The source registers of all instructions are passed to RFMXING 806 via a bus 816. Renamed source registers of all instructions are stored in RRRF 600 via a bus 818. The stored renamed source registers of all instructions are passed to; RFMXING 806, MONDEP 808 and RDY_GEN 810 via a bus 820.

MONDEP 808 determines which dependencies have disappeared by comparing the tags of retiring or recently-retired instructions with the lower three bits of the renamed sources of each instruction. Information regarding retired instructions is sent to MONDEP 808 via a bus 828 from a retirement unit (not shown; the details of a retirement unit that can be used to generate these signals is disclosed in co-pending, commonly owned patent application Ser. No. 07/877,451, filed May 15, 1992). If there is a match, then MONDEP 808 knows that the dependency has been removed and the outputs of MONDEP 808 outputs which instructions' inputs have been moved from the temp buffer to the register file. These outputs signals are sent to RFMXING 806 and RDY_GEN 810 via buses 822.

In a preferred embodiment of the present invention, the instruction window holds eight instructions. Each cycle, at most three of those instructions can be retired. In the cycle after an instruction is retired, its tag is moved to the top of the FIFO. Therefore, to check what dependencies have been removed, MONDEP 808 compares each of the renamed sources of each instruction with the tags of the top three instructions in the FIFO. In a further embodiment MONDEP 808 can compare each renamed source with the tags of the instructions at the bottom of the FIFO that are about to be retired.

MONDEP 808 outputs a bit for each source of each instruction and the bits are sent to RFMXING and RDY_GEN blocks in the RRC. These bits are asserted when an instruction's dependency goes away and remain asserted until the instruction is retired.

RDY_GEN 810 determines when each instruction's sources are available and outputs this information via a bus 830. The difference between MONDEP 808 and RDY_GEN 810 is MONDEP 808 only monitors when instructions retire. An instruction does not have to wait until another instruction retires to use its result; it only needs to wait until it is done (an instruction is done when its result is entered into the temp buffer). Also, if an instruction has no dependencies, then it can be executed immediately. Information concerning whether an instruction is "done" is input to RDY_GEN 810 via a bus 832. "Done" signals come from done control logic (not shown). In connection with the present invention, the term "done" means the result of the instruction is in a temporary buffer or otherwise available at the output of a functional unit. (An example of done control logic may be found the '719 application.)

RDY_GEN 810 has one output for each source of all instructions in the window. The output for a particular instruction's source is assured if one of three conditions is true:

1. The source was never dependent on any other instruction.

2. The instruction that the source was dependent on is done and its result is in the temp buffer.

3. The instruction that the source was dependent on is retired and its result has been moved from the temp buffer to the register file.

These outputs 830 of RDY_GEN 810 go to the ISSUER which determines which instruction(s) is to issued based on functional unit availability and lack of dependencies.

RFMXING 806 is used to generate the read addresses of the register files. It contains a collection of muxes for each read port of each register file. These muxes are selected by the outputs of the ISSUER and MONDEP 808. Read addresses for each port of each register file are output by RFMXING 806, via a bus 824. (A processor may have a separate register file for a floating point subprocessor and an integer subprocessor, for example.)

Figure 9:
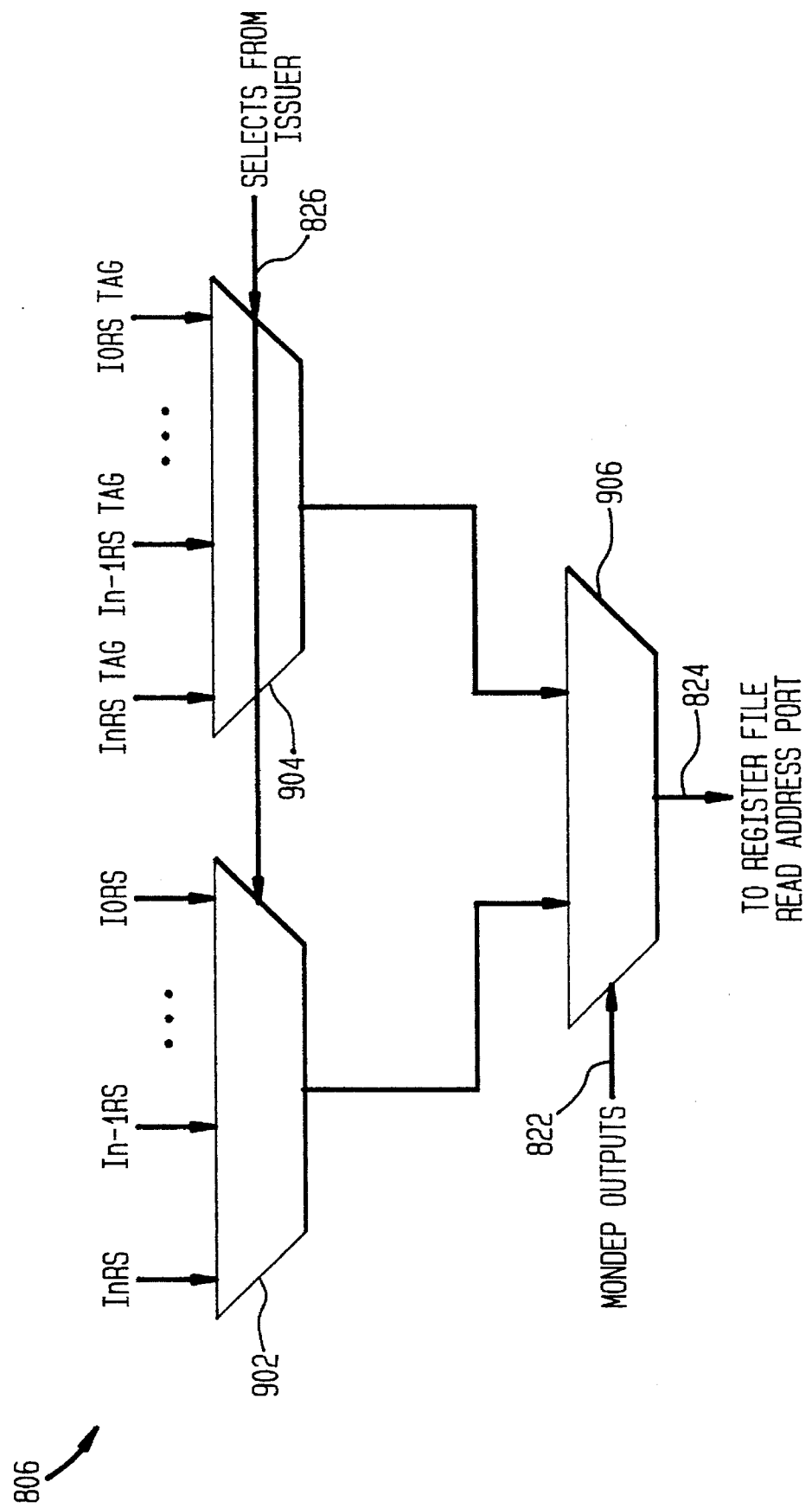
FIG. 9 shows a representative block diagram of a circuit to generate the address for one register file port.

The circuit to generate the address for one register file port is shown in FIG. 9. The ISSUER decides which instructions to execute and which register file ports to use for each instruction by sending select signals via a bus 826 to RFMXING 806. MONDEP 808 decides which instructions sources have been moved from the register file and which are still inside the temp buffer via bus 822. For example, if one assumes that the ISSUER decides to execute instruction $I_n$ and $I_n$ is dependent on $I_{n-1}$; then the ISSUER will select (via select signals 826) two top multiplexers (mux) 902 and 904 and choose $I_n RS$ ($I_n$'s original source register address) and $I_n RS\_TAG$. If it has, MONDEP 808 will select, using a third mux 906, the output of mux 902 on the left and send $I_n RS$ to the register file. If not, it will choose the output of mux 904 on the right and send the $I_n RS\_TAG$ to the register file.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents. All cited patent documents and publications in the above description are incorporated herein by reference.

What is claimed is:

1. A system for renaming source registers of at least one instruction in an instruction window, comprising:

control logic that assigns a tag to each new instruction that enters the instruction window, wherein said tag comprises a unique address in a temporary buffer where instruction execution results are stored;

a recycling queue comprising a plurality of slots equal in number to a predetermined size of the instruction window, each of said plurality of slots containing one of said tags, wherein an order defined by a position of said assigned tags in said recycling queue corresponds to an order of instructions in the instruction window;

selecting means for selecting a tag assigned to a first instruction as a register address of a source register of a second instruction if said source register of said second instruction is dependant on said first instruction, wherein said selected tag is a renamed register address for said source register of said second instruction; and a register file that stores renamed register addresses at address locations indicated by said tags, wherein a tag assigned to said second instruction, when applied to a read address port of said register file, outputs said renamed register address for said source register of said second instruction at a read data port of said register file.

2. The system of claim 1, further comprising dependency check means for determining whether a source register of said second instruction is dependant on an instruction result of said first instruction.

3. The system of claim 2, wherein said dependency check means comprises means for determining a highest priority dependency for said first instruction.

4. The system of claim 1, wherein the instruction window is a variable advance instruction window.

5. The system of claim 1, further comprising:

means for determining whether said first instruction has retired, wherein retirement comprises the step of transferring an execution result from said temporary buffer to a main register file; and means for replacing a renamed register address of said second instruction with a main register file address if said first instruction has retired to allow said second instruction to retrieve said source operand from said main register file.

6. The system of claim 1, further comprising means for comparing a tag of a retired instruction with renamed source addresses to determine whether a dependency has disappeared.

7. A computer system, comprising:

a memory unit for storing program instructions;

a bus coupled to said memory unit for retrieving said program instructions; and a processor coupled to said bus, wherein said processor comprises a register renaming system, comprising:

control logic that assigns a tag to each new instruction that enters the instruction window, wherein said tag comprises a unique address in a temporary buffer where instruction execution results are stored;

a recycling queue comprising a plurality of slots equal in number to a predetermined size of the instruction window, each of said plurality of slots containing one of said tags, wherein an order defined by a position of said assigned tags in said recycling queue corresponds to an order of instructions in the instruction window;

selecting means for selecting a tag assigned to a first instruction as a register address of a source register of a second instruction if said source register of said second instruction is dependant on said first instruction, wherein said selected tag is a renamed register address for said source register of said second instruction; and a register file that stores renamed register addresses at address locations indicated by said tags, wherein a tag assigned to said second instruction, when applied to a read address port of said register file, outputs said renamed register address for said source register of said second instruction at a read data port of said register file.

8. The computer system of claim 7, further comprising dependency check means for determining whether a source register of said second instruction is dependant on an instruction result of said first instruction.

9. The computer system of claim 8, wherein said dependency check means comprises means for determining a highest priority dependency for said first instruction.

10. The computer system of claim 7, wherein the instruction window is a variable advance instruction window.

11. The computer system of claim 7, further comprising:

means for determining whether said first instruction has retired, wherein retirement comprises the step of transferring an execution result from said temporary buffer to a main register file; and means for replacing a renamed register address of said second instruction with a main register file address if said first instruction has retired to allow said second instruction to retrieve said source operand from said main register file.

12. The computer system of claim 7, further comprising means for comparing a tag of a retired instruction with renamed source addresses to determine whether a dependency has disappeared.

13. A method for renaming source registers of at least one instruction in an instruction window, comprising the steps of:

(1) assigning a tag that is stored in a recycling queue to an instruction entering the instruction window, wherein said tag comprises a unique address in a temporary buffer that stores instruction execution results, wherein said recycling queue comprises a plurality of slots equal in number to a predetermined size of the instruction window, each of said plurality of slots containing one of said tags, wherein an order defined by a position of said assigned tags in said recycling queue corresponds to an order of instructions in the instruction window;

(2) selecting a tag assigned to a first instruction as a register address of a source register of a second instruction if said source register of said second instruction is dependant on said first instruction, wherein said selected tag is a renamed register address for said source register of said second instruction; and (3) storing renamed register addresses in a register file at address locations indicated by said tags, wherein a tag assigned to said second instruction, when applied to a read address port of said register file, outputs said renamed register address for said source register of said second instruction at a read data port of said register file.

14. The method of claim 13, wherein said step (2) comprises the step of determining whether a source register of said second instruction is dependant on an instruction result of said first instruction.

15. The method of claim 14, further comprising the step of determining a highest priority dependency for said first instruction.

16. The method of claim 13, further comprising the steps of:

(4) determining whether said first instruction has retired, wherein retirement comprises the step of transferring an execution result from said temporary buffer to a main register file; and (5) replacing a renamed register address of said second instruction with a main register file address if said first instruction has retired to allow said second instruction to retrieve said source operand from said main register file.

17. The method of claim 13, further comprising the step of comparing a tag of a retired instruction with renamed source addresses to determine whether a dependency has disappeared.

* * * * *

UNITED STATES PATENT AND TRADEMARK OFFICE
CERTIFICATE OF CORRECTION

Page 1 of 5

PATENT NO. : 5,590,295
DATED : December 31, 1996
INVENTOR(S) : Deosaran et al.

It is certified that error appears in the above-indentified patent and that said Letters Patent is hereby corrected as shown below:

On the title page: Item [52]

replace "395/393" with --395/375--.

On the face of the Letters Patent, Under References Cited: Item [56]

Under U.S. Patent Documents, insert the following:

| | | | |
|---|---|---|---|
| 4,903,196 | 2/1990 | Pomerene et al | 395/375 |
| 5,067,069 | 11/1991 | Fite et al. | 395/375 |
| 5,072,364 | 12/1991 | Jardine et al. | 395/375 |
| 5,109,495 | 4/1992 | Fite et al. | 395/375 |
| 5,167,026 | 11/1992 | Murray et al. | 395/375 |
| 5,214,763 | 5/1993 | Blanner et al. | 395/375 |
| 5,226,126 | 7/1993 | McFarland et al. | 395/375 |
| 5,251,306 | 10/1993 | Tran | 395/375 |
| 5,317,720 | 3/1994 | Stamm et al. | 395/425 |
| 5,345,569 | 9/1994 | Tran | 395/375 |
| 5,398,330 | 3/1995 | Johnson | 395/575 |

UNITED STATES PATENT AND TRADEMARK OFFICE
CERTIFICATE OF CORRECTION

PATENT NO. : 5,590,295

DATED : December 31, 1996

INVENTOR(S) : Deosaran et al.

It is certified that error appears in the above-indentified patent and that said Letters Patent is hereby corrected as shown below:

Under the list of U.S. Patent Documents cited, insert:
--Foreign Patent Documents--.

Under Foreign Patent Documents, insert the following:

WO 8,809,035    11/1988    International

O 515,166    11/1992    European Pat. Off.

Under Other Publications, insert the following articles:

Keller, R., "Look-Ahead Processors," Computing Surveys, Vol. 7, No. 4, December 1975.

Patt et al., "Critical Issues Regarding HPS, A High Performance Microarchitecture," The 18th Annual Workshop on Microprogramming, Pacific Grove, California, Dec. 3-6, 1985, IEEE Computer Order No. 653, pp. 109-116.

Patt et al., "HPS, A New Microarchitecture: Rationale and Introduction," The 18th Annual Workshop on Microprocessing, Pacific Grove, California, Dec. 3-6, 1985, IEEE Computer Society Order No. 653, pp. 103-108.

Johnson, Mike, "The Role of Exception Recovery," Chapter 5, pp. 87-102 and "Register Dataflow," Chapter 6, pp. 103-125, Superscalar Microprocessor Design, Prentice Hall, 1991.

Peleg et al., "Future Trends in Microprocessing: Out-Of-Order Execution, Speculative Branching and Their CISC Performance Potential," March 1991.

UNITED STATES PATENT AND TRADEMARK OFFICE
CERTIFICATE OF CORRECTION

PATENT NO. : 5,590,295

DATED : December 31, 1996

INVENTOR(S) : Deosaran et al.

It is certified that error appears in the above-indentified patent and that said Letters Patent is hereby corrected as shown below:

Popescu et al, "The Metaflow Architecture,", IEEE Mirco Vol. 11, No. 3, pp. 10-13, 63-73, June 1991.

Dywer, A Multiple, Out-of-Order Instruction Issuing System for Superscalar Processors, (All), August 1991.

Hwu et al., "An HPS Implementation of VAX: Initial Design and Analysis," Proceedings of the Nineteenth Annual Hawaii International Conference on System Sciences, pp. 282-291, 1986.

Patt et al., "Experiments with HPS, a Restricted Data Flow Microarchitecture for High Performance Computers," COMPCON 86, 1986.

Hwu et al., "HPSm, A High Performance Restricted Data Flow Architecture Having Minimal Functionality," Proceedings of the 18th International Symposium on Computer Architecture, pp. 297-306, June 1986.

Patt et al., "Run-Time Generation of HPS Microinstructions for a VAX Instruction Stream," Proceedings of MICRO 19 Workshop, New York, NY, pp. 1-7, October 1986.

Swenson et al., "Hierarchical Register for Scientific Computers," St. Malo '88, University if California at Berkeley, pp. 346-353, 1988.

Butler et al., "An Improved Area-Efficient Register Alias Table for Implementing HPS," University of Michigan, Ann Arbor, MI, pp. 1-15, January 1990.

UNITED STATES PATENT AND TRADEMARK OFFICE
CERTIFICATE OF CORRECTION

PATENT NO. : 5,590,295

Page 4 of 5

DATED : December 31, 1996

INVENTOR(S) :

Deosaran *et al.*

It is certified that error appears in the above-indentified patent and that said Letters Patent is hereby corrected as shown below:

Uvieghara *et al.*, "An experimental Single-Chip Data Flow CPU," Symposium on USLI Circuits Design Digest of Technical Papers, May, 1990.

Melvin *et al.*, "Exploiting Fine-grained parallelism Through a Combination of Hardware and Software Techniques," Proceedings From ISCA-18, pp. 287-296, May 1990.

Butler *et al.*, "Single Instruction Stream Parallelism Is Greater Than Two," Proceedings of ISCA-18, pp. 276-286, May 1990.

Uvieghara *et al.*, "An Experimental Single-Chip Data Flow CPU," IEEE Journal of Solid-State Circuits, Vol.. 27, No. 1, pp. 17-28, January 1992.

Gee *et al.*, "The Implementation of Prolog Via VAX 8600 Microcode," Proceedings of MICRO 19, New York City, NY, pp. 1-7, October 1986.

UNITED STATES PATENT AND TRADEMARK OFFICE
CERTIFICATE OF CORRECTION

PATENT NO. : 5,590295
DATED : December 31, 1996
INVENTOR(S) : Deosaran et al

It is certified that error appears in the above-indentified patent and that said Letters Patent is hereby corrected as shown below:

Hwu *et al.*, "Design Choices for the HPSm Microprocessor Chip," <u>Proceedings of the Annual Twelfth Hawaii International Conference on System Sciences</u>, pp. 330-336, 1987.

Wilson *et al.*, "On Turning the Microarchitecture of an HPS Implementation of the VAX," <u>Proceedings of MICRO 20</u>, pp. 162-167, December 1987.

Hwu *et al.*, HPSm2: A Refined Single-chip Microengine," <u>HICSS '88</u>, pp. 30-40, 1988.

Butler *et al.*, "An Investigation of the Performance of Various Dynamic Scheduling Techniques," <u>Proceedings from MICRO-25</u>, December 1-4, 1992, pp. 1-9.

Signed and Sealed this

Twenty-ninth Day of April, 1997

*Attest:*

BRUCE LEHMAN

*Attesting Officer*  *Commissioner of Patents and Trademarks*